United States Patent
Hwang et al.

(10) Patent No.: US 9,357,573 B2
(45) Date of Patent: May 31, 2016

(54) METHOD OF PROVIDING SERVICE CONTINUITY BETWEEN CELLULAR COMMUNICATION AND DEVICE TO-DEVICE COMMUNICATION

(71) Applicant: Electronics and Telecommunications Research Institute, Daejeon (KR)

(72) Inventors: You Sun Hwang, Seoul (KR); Kwang Ryul Jung, Daejeon (KR); Mi Jeong Yang, Daejeon (KR); Hyung Deug Bae, Daejeon (KR); Soon Yong Lim, Daejeon (KR); Moon Soo Jang, Daejeon (KR); Hyeong Jun Park, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 14/090,390

(22) Filed: Nov. 26, 2013

(65) Prior Publication Data

US 2014/0162633 A1 Jun. 12, 2014

(30) Foreign Application Priority Data

Dec. 6, 2012 (KR) .................. 10-2012-0141495

(51) Int. Cl.
*H04W 4/00* (2009.01)
*H04W 76/02* (2009.01)
*H04W 8/00* (2009.01)
*H04W 76/04* (2009.01)

(52) U.S. Cl.
CPC ............ *H04W 76/023* (2013.01); *H04W 8/005* (2013.01); *H04W 76/043* (2013.01)

(58) Field of Classification Search
None
See application file for complete search history.

(56) References Cited

U.S. PATENT DOCUMENTS

| 8,452,317 | B2 | 5/2013 | Li et al. | |
|---|---|---|---|---|
| 2010/0261469 | A1 | 10/2010 | Ribeiro et al. | |
| 2011/0081890 | A1 | 4/2011 | Ahmadvand et al. | |
| 2011/0141890 | A1* | 6/2011 | Giaretta | H04W 28/20 370/232 |
| 2012/0258703 | A1 | 10/2012 | Hakola et al. | |
| 2014/0254523 | A1* | 9/2014 | Chai | H04W 76/02 370/329 |

FOREIGN PATENT DOCUMENTS

| CN | 103139930 | * 6/2015 |
|---|---|---|
| KR | 10-1166958 | 7/2012 |
| KR | 10-2012-0085648 | 8/2012 |

* cited by examiner

*Primary Examiner* — Suhail Khan
(74) *Attorney, Agent, or Firm* — Nelson Mullins Riley & Scarborough LLP

(57) ABSTRACT

A method of providing service continuity between cellular communication and device-to-device communication is disclosed. A procedure for switching between cellular communication and device-to-device communication according to an example embodiment of the present invention may include transferring, by a gateway, a D2D bearer creation request message to an MME, transferring, by the MME, the D2D bearer creation request message to a base station, mapping, by the base station, D2D bearer QoS to D2D radio bearer QoS and transmitting an RRC connection reconfiguration message to terminals, receiving, by the base station, an RRC connection reconfiguration completion message indicating creation of a D2D radio bearer from the terminals, transmitting, by the base station, a D2D bearer creation response message indicating creation of a D2D bearer to the MME, and transferring, by the MME, the D2D bearer creation response message to the gateway.

6 Claims, 4 Drawing Sheets

METHOD OF PROVIDING SERVICE CONTINUITY BETWEEN CELLULAR COMMUNICATION AND DEVICE TO-DEVICE COMMUNICATION

CLAIM FOR PRIORITY

This application claims priority to Korean Patent Application No. 2012-0141495 filed on Dec. 6, 2012 in the Korean Intellectual Property Office (KIPO), the entire contents of which are hereby incorporated by reference.

BACKGROUND

1. Technical Field

Example embodiments of the present invention relate to device-to-device communication, and more specifically, to a method of operating a network that performs switching between cellular communication and device-to-device communication in order to provide service continuity between the cellular communication and the device-to-device communication.

2. Related Art

Recently, in a cellular mobile communication system, a scheme for direct communication between a device and a device has been discussed. This is because there is a need for a network capacity, a data transfer rate, good service quality and the like for providing service to many users with rapid increase in data traffics due to the spread of various communication terminals.

Direct communication between mobile communication devices, namely, device-to-device communication (D2D) is considered as a scheme for meeting users' requirements by improving performance of an existing mobile communication system at low cost.

A device is a term indicating a communication terminal included in a cell, and is the same as a user (UE) in terms of functions. Direction communication between two devices is called device-to-device (D2D) communication.

A concept of the D2D communication is used in the fields such as a sensor network or WiFi Direct. Recently, cellular-based D2D communication has begun to be discussed even in a 3GPP system.

Meanwhile, if service continuity from a cellular communication session to a device-to-device communication session is provided when two terminals performing cellular communication approaches each other, resources of a network can be reused. However, a procedure of switching terminals performing cellular communication to device-to-device communication or switching terminals performing device-to-device communication to cellular communication is not defined.

SUMMARY

Accordingly, example embodiments of the present invention are provided to substantially obviate one or more problems due to limitations and disadvantages of the related art.

Example embodiments of the present invention provide a method of operating a network to determine proximity between terminals that is a condition for a determination as to whether device-to-device communication can be performed, for enabling switching between cellular communication and device-to-device communication while providing service continuity.

Example embodiments of the present invention also provide a method of operating a network to switch a scheme for communication between terminals from cellular communication to device-to-device communication while providing service continuity between the cellular communication and the device-to-device communication.

Example embodiments of the present invention also provide a method of operating a network to switch a scheme for communication between terminals from device-to-device communication to cellular communication while providing service continuity between the cellular communication and the device-to-device communication.

In some example embodiments, a network procedure for determining proximity between terminals for device-to-device communication may include: transmitting, by a gateway, a D2D measurement configuration message to a mobility management entity (MME); transferring, by the MME, the D2D measurement configuration message to a base station; transmitting, by the base station, a message including configuration information of a signal for measurement to a first terminal that will transmit a signal for measurement and a second terminal that will measure the signal for measurement; receiving, by the base station, a measurement completion message from the first terminal and the second terminal and transferring a D2D measurement configuration completion message including a measurement result based on the received measurement completion message to the MME; and transferring, by the MME, the D2D measurement configuration completion message to the gateway.

Here, the proximity measurement configuration message may include a pair identifier for designating the first terminal and the second terminal.

Here, the message including the configuration information of the signal for measurement may be an RRC connection reconfiguration message, and the measurement completion message may be an RRC connection reconfiguration completion message.

In other example embodiments, a network procedure for switching communication from cellular communication to device-to-device communication may include: (a) transferring, by a gateway, a D2D bearer creation request message to a mobility management entity (MME); (b) creating, by the MME, an D2D bearer ID and transferring a D2D bearer setup request message based on the D2D bearer creation request message and including the D2D bearer ID to a base station; (c) mapping, by the base station, D2D bearer QoS to D2D radio bearer QoS, and transmitting an RRC connection reconfiguration message to terminals; (d) receiving, by the base station, an RRC connection reconfiguration completion message indicating creation of a D2D radio bearer from the terminals; (e) transmitting, by the base station, a D2D bearer creation response message indicating creation of a D2D bearer to the MME; and (f) transferring, by the MME, the D2D bearer creation response message to the gateway.

Here, the gateway may include a packet data network gateway (P-GW) and a serving gateway (S-GW), and the transferring, by the gateway, the D2D bearer creation request message to the MME may include determining, by the P-GW, QoS of a D2D bearer, creating a pair identifier of a device-to-device communication pair, and transferring, to the S-GW, the D2D bearer creation request message including at least one of the pair identifier, the D2D bearer QoS, and a cellular switchback EPS bearer ID (SBI); and transferring, by the S-GW, the D2D bearer creation request message to the MME.

Here, in step (b), the MME may generate a proximity service management request message in a non-access stratum (NAS) level, include the proximity service management request message in the D2D bearer creation request message, and transmit the resultant message to the base station, and the proximity service management request message may include the pair identifier, IMSI, the D2D bearer ID, the D2D bearer QoS, D2D bearer traffic flow template (TFT), and the cellular switchback EPS bearer ID (SBI). In this case, in step (c), the base station may include the proximity service management request message in the RRC connection reconfiguration message and transmit the resultant message to the terminal. In this case, in step (d), the base station may receive a direct transfer message including the proximity service management response message from an NAS of the terminal. In this case, in step (e), the base station may transmit an uplink NAS transport message including the proximity service management response message to the MME.

Here, in step (f), the gateway may include a packet data network gateway (P-GW) and a serving gateway (S-GW), and step (f) may include: transferring, by the MME, the D2D bearer creation response message to the S-GW; and transferring, by the S-GW, the D2D bearer creation response message to the P-GW.

In still other example embodiments, a network procedure for performing device-to-device communication may include: (a) transferring, by a gateway, a D2D command message for performing device-to-device communication to a mobility management entity (MME); (b) transferring, by the MME, the D2D command message to a base station; and (c) transmitting, by the base station, an RRC status message including the D2D command message to terminals.

Here, in step (b), the base station may initiate L2 scheduling when receiving the D2D command message for at least two terminals from the MME.

In still other example embodiments, a network procedure for switching communication from device-to-device communication to cellular communication includes: (a) transferring, by a gateway, a D2D bearer deletion request message including a D2D bearer ID to a mobility management entity (MME); (b) transferring, by the MME, a D2D bearer deactivation request message including the D2D bearer ID to a base station; (c) transmitting, by the base station, an RRC connection reconfiguration message to terminals, the RRC connection reconfiguration message including a D2D radio bearer ID corresponding to the D2D bearer ID and requesting to release a D2D radio bearer indicated by the D2D radio bearer ID; (d) receiving, by the base station, an RRC connection reconfiguration completion message indicating release of the D2D radio bearer from the terminals; (e) transmitting, by the base station, a D2D bearer deactivation response message indicating release of the D2D bearer to the MME; and (f) transferring, by the MME, the D2D bearer deactivation response message to the gateway.

Here, in step (a), the gateway may include a packet data network gateway (P-GW) and a serving gateway (S-GW), and step (a) may include: determining, by the P-GW, switching to the cellular communication and transferring the D2D bearer deletion request message to the S-GW, the D2D bearer deletion request message including a pair identifier of a device-to-device communication pair to be switched to the cellular communication, and a D2D bearer ID; and transferring, by the S-GW, the D2D bearer deletion request message to the MME.

Here, in step (b), the MME may generate a proximity service management request message in a non-access stratum (NAS) level, include the proximity service management request message in the D2D bearer deletion request message, and transmit the resultant message to the base station, and the proximity service management request message may include the pair identifier and the D2D bearer ID. In this case, in step (c), the base station may include the proximity service management request message in the RRC connection reconfiguration message and transmit the resultant message to the terminal. In this case, in step (d), the base station may receive a direct transfer message including the proximity service management response message from an NAS of the terminal. In this case, in step (e), the base station may transmit an uplink NAS transport message including the proximity service management response message to the MME.

Here, in step (f), the gateway may include a packet data network gateway (P-GW) and a serving gateway (S-GW), and step (f) may include transferring, by the MME, the D2D bearer deletion response message to the S-GW; and transferring, by the S-GW, the D2D bearer deletion response message to the P-GW.

In example embodiments of the present invention, in a cellular-based mobile communication system, a setting procedure is defined so that terminals capable of performing device-to-device communication can be switched from cellular communication to device-to-device communication when the terminals are close to each other while performing cellular communication, and then switched to the cellular communication under a certain condition while performing the device-to-device communication, thus enabling reuse of resources of the network when being switched to the device-to-device communication.

The purposes can be achieved at low cost since messages or the like defined in an existing system for providing such service continuity are used.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
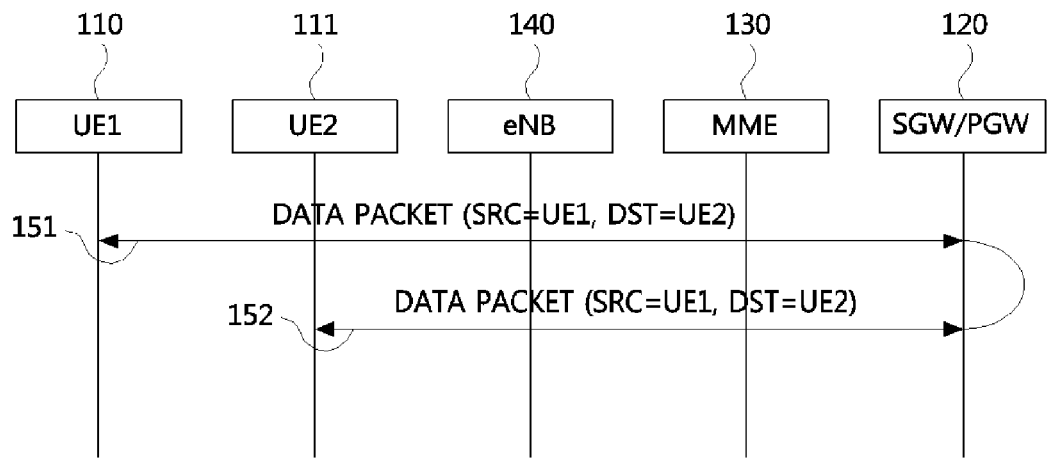
FIG. 1 is a message flow diagram illustrating a data transfer procedure between two terminals performing cellular communication.

While the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "terminal" used in this disclosure may be referred to as a mobile station (MS), user equipment (UE), user terminal (UT), wireless terminal, access terminal (AT), terminal, subscriber unit, subscriber station (SS), wireless device, wireless communication device, wireless transmit/receive unit (WTRU), mobile node, mobile or the like. Various example embodiments of the terminal may include a cellular telephone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback appliance having a wireless communication function, an Internet appliance having wireless Internet accessing and browsing functions, and a portable unit or terminal having a combination of such functions, but are not limited thereto.

A "base station" used in this disclosure generally refers to a stationary or mobile point that communicates with a terminal. The base station may be referred to as node-B, eNode-B, a base transceiver system (BTS), an access point, a relay, a femto cell or the like.

FIG. 1 is a message flow diagram illustrating a data transfer procedure between two terminals performing cellular communication.

Referring to FIG. 1, data that a first terminal 110 and a second terminal 111 transmit or receive is transferred to each other via an S-GW/P-GW (gateway) 120.

In other words, data transferred from the first terminal 110 to the second terminal 111 first reaches the gateway 120 via a base station 140 (151) and then reaches the second terminal 111 from the gateway 120 via the base station 140 (152). In cellular communication, even when the first terminal 110 and the second terminal 111 are located to be adjacent, indirect data transfer as described above is performed.

Efficiency of the device-to-device communication may be achieved by performing direct data transmission and reception between terminals when the first terminal 110 and the second terminal 111 are located to be adjacent at such a distance that data transmission and reception can be performed.

An object of an example embodiment of the present invention is to provide a method by which terminals performing cellular communication is switched from a cellular communication session to a device-to-device communication session or from the device-to-device communication session to the cellular communication session. Accordingly, a procedure for determining proximity between both terminals to confirm whether the terminals performing cellular communication are enough adjacent to be switched to device-to-device communication and able to transmit and receive data is necessary.

Hereinafter, a network procedure for determining proximity between terminals will be first described and then a session switching procedure will be described.

Procedure for Confirming Proximity Between Terminals

Figure 2:
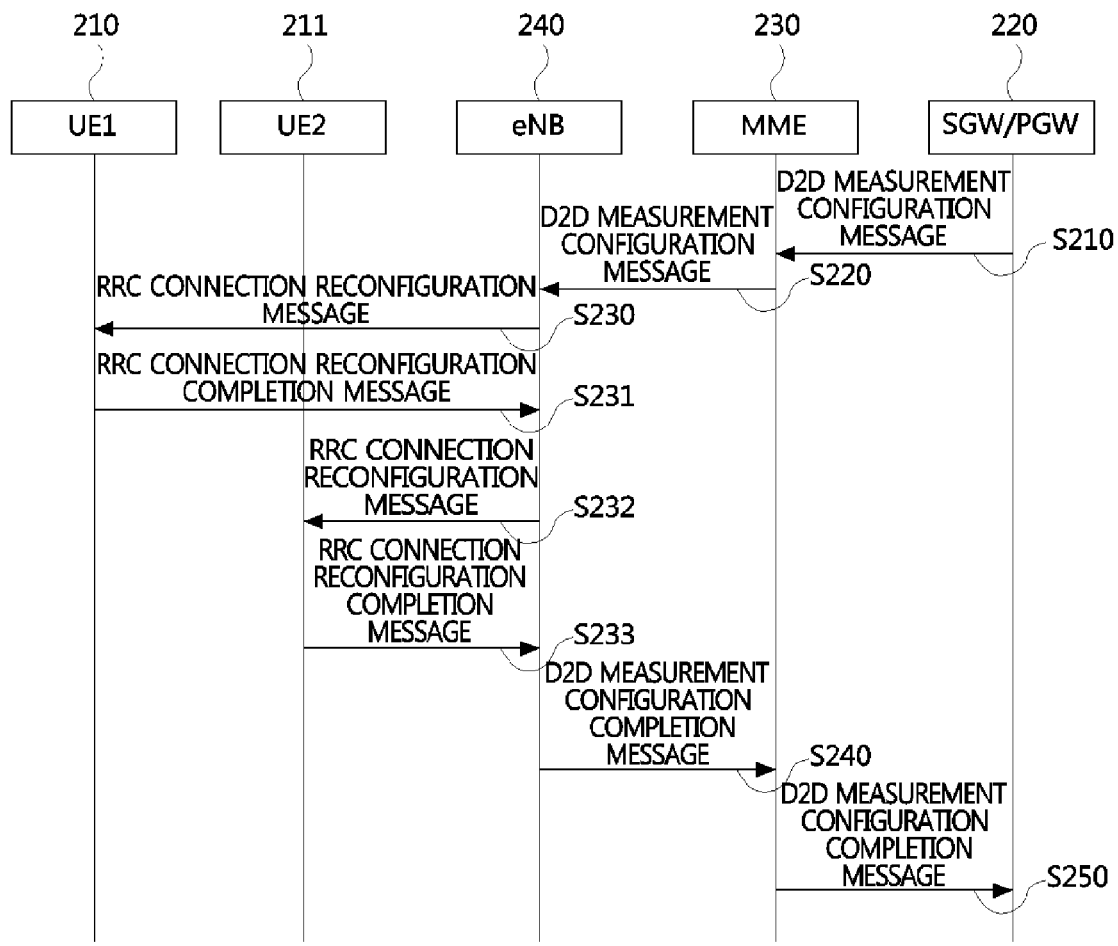
FIG. 2 is a message flow diagram illustrating a procedure for confirming proximity between terminals according to an example embodiment of the present invention.

FIG. 2 is a message flow diagram illustrating a procedure for confirming proximity between terminals according to an example embodiment of the present invention.

FIG. 2 illustrates a procedure for measuring whether two terminals communicating via a gateway (or a node that manages positions of two terminals; referred herein to as a gateway and referred in the following procedure to as a serving gateway (S-GW)/packet data network is gateway (P-GW)) are close to each other (proximity).

Referring to FIG. 2, the procedure for confirming proximity between terminals according to an example embodiment of the present invention may include a procedure for a measurement setting through message exchange between network components (a gateway 220, an MME 230, and a base station 240) and terminals (a first terminal 210 and a second terminal 211), and measurement between the terminals. In other words, the procedure for confirming proximity between terminals according to an example embodiment of the present invention may include step S210 of transmitting, by a gateway, a D2D measurement configuration message to the MME, step S220 of transferring, by the MME, the D2D measurement configuration message to a base station, steps S230 and S231 of transmitting, by the base station, a message including configuration information of a signal for measurement to a first terminal that will transmit a signal for measurement and a second terminal that will measure the signal for measurement, steps S231 and S233 of receiving, by the base station, a measurement completion message from the first terminal and the second terminal, step S240 of transferring a result message including a measurement result based on the received measurement completion message to the MME, and step S250 of transferring, by the MME, the result message to the gateway.

First, in step S210, the gateway 220 determines initiation of proximity measurement based on whether the first terminal and the second terminal are connected to the same cell, a network load, traffic volume or the like. In order to initiate the measurement, the gateway transmits a D2D measurement configuration message to the MME (a node that manages session information and control information of the terminal). The D2D measurement configuration message may include a pair identifier (pair ID) for identifying a terminal pair performing device-to-device communication. In this case, the initiation of the proximity measurement described above may be determined by the P-GW, and the pair identifier may also be allocated by the P-GW. The D2D measurement configuration message described above may be transferred to the S-GW by the P-GW and to the MME by the S-GW.

Next, in step S220, the MME 230 receiving the D2D measurement configuration message from the gateway transfers the D2D measurement configuration message to the base station (eNB; 240). In this case, the MME may directly transfer the D2D measurement configuration message received from the gateway, to the base station or may generate a D2D measurement configuration message to which a format and content have been partially added based on the D2D measurement configuration message received from the gateway, and transfer the generated D2D measurement configuration message to the base station.

Then, in step S230, the base station transmits an RRC connection reconfiguration message for instructing the first terminal, which will transmit a signal for measurement, to transmit a signal for D2D measurement. In this case, the RRC connection reconfiguration message includes configuration information (e.g., radio resource information or sequence information of the signal for measurement) necessary for measurement signal transmission. The first terminal performs an operation of transmitting the signal for measurement based on the received configuration information.

In step S232, the base station also transmits an RRC connection reconfiguration message to the second terminal that will receive the signal for measurement. Configuration information (e.g., radio resource information or sequence information of the signal for measurement) necessary for reception of the signal for measurement transmitted by the first terminal may be included in the RRC connection reconfiguration message transmitted to the second terminal. This configuration information may correspond to the configuration information necessary for transmission of the signal for measurement transferred to the first terminal. The second terminal performs an operation of receiving the signal for measurement based on the received configuration information.

In this case, while a measurement request message is shown in FIG. 2 as being transferred from the same base station, a target terminal for proximity confirmation may be connected to a different base station, not the same base station. In this case, the MME may transmit the same message for measurement to the base stations that the respective terminals belong to.

Then, in steps S231 and S233, the base station receives an RRC connection reconfiguration completion message indicating that the proximity measurement has been completed from the terminals. The base station confirms that the measurement between the first terminal and the second terminal has been performed, from the fact that the RRC connection reconfiguration completion messages have been both received from the terminals.

In this case, while the base station is shown in FIG. 2 as transmitting the RRC connection reconfiguration message to the first terminal (S230), receiving the RRC connection reconfiguration completion message from the first terminal (S231), and then transmitting the RRC connection reconfiguration message to the second terminal (S232), such an RRC connection reconfiguration procedure of the first terminal and the second terminal may be performed concurrently.

Then, in step S240, the base station receiving the RRC connection reconfiguration completion message from both the terminals recognizes that the D2D measurement configuration for the first terminal and the second terminal has been completed, and transmits a D2D measurement configuration completion message to the MME.

Finally, in step S250, the MME transfers the D2D measurement configuration completion message to the gateway.

In step S250, the gateway may determine the proximity between the terminals based on a measurement result included in the message received from the MME. Meanwhile, the proximity determination may be made by the base station or the MME, as well as the gateway, and in this case, the base station or the MME may transfer a proximity determination result to the gateway.

The gateway may determine whether a session of the terminals performing cellular communication is to be switched from a cellular communication session to a device-to-device communication session based on the determined proximity between the terminals.

Once it is confirmed that the terminals are in enough proximity to be able to perform device-to-device communication through the procedure for confirming the proximity between terminals described above, the terminals performing the cellular communication may switch the session to device-to-device communication.

Figure 3:
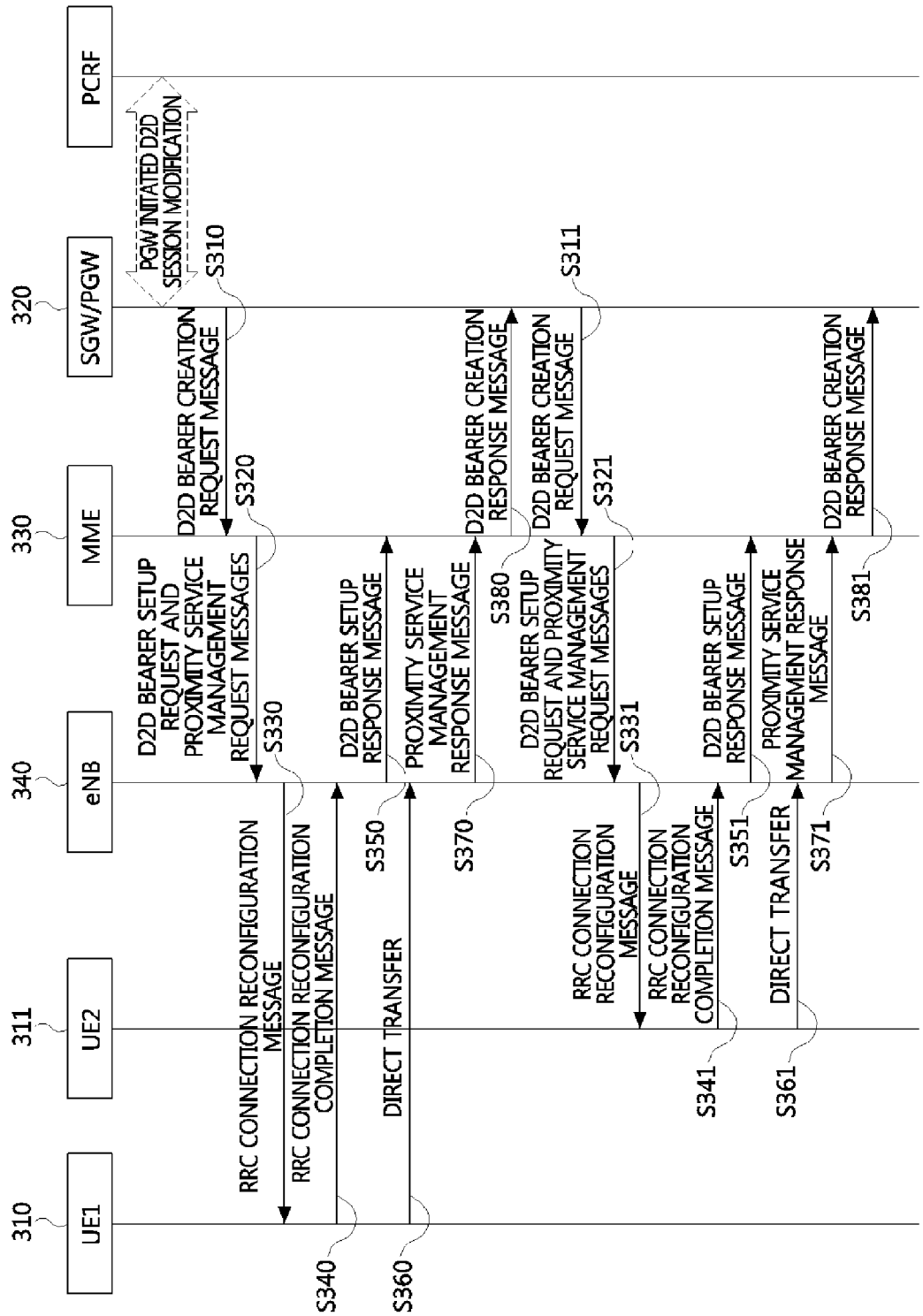
FIG. 3 is a message flow diagram illustrating an aspect of session switching from cellular communication to device-to-device communication according to an example embodiment of the present invention.

Procedure for Session Switching from Cellular Communication to Device-to-Device Communication A procedure for session switching from cellular communication to device-to-device communication according to an example embodiment of the present invention may include a first aspect constituting a preparation procedure for switching a session from cellular communication to device-to-device communication, and a second aspect constituting a procedure for performing actual device-to-device communication after the preparation procedure FIG. 3 is a message flow diagram illustrating an aspect of session switching from cellular communication to device-to-device communication according to an example embodiment of the present invention.

The procedure illustrated in FIG. 3 illustrates a preparation procedure for recognizing that two terminals communicating through a cellular communication session are in close proximity in a network and switching a session to a device-to-device communication session for reuse of resources of the network.

Referring to FIG. 3, the session switching procedure according to an example embodiment of the present invention may include a procedure for message exchange between network components (a gateway, an MME, and a base station) and terminals (a first terminal and a second terminal), and session switching. In other words, the procedure for session switching from cellular communication to device-to-device communication according to an example embodiment of the present invention may include steps S310 and S311 of transferring, by the gateway, a D2D bearer creation request message to the MME, steps S320 and S321 of creating, by the MME, an D2D bearer ID and transferring a D2D bearer setup request message based on the D2D bearer creation request message and including the D2D bearer ID to the base station, steps S330 and S331 of mapping, by the base station, D2D bearer QoS to D2D radio bearer QoS and transmitting an RRC connection reconfiguration message to the terminals, steps S340 and S341 of receiving, by the base station, an RRC connection reconfiguration completion message indicating creation of a D2D radio bearer from the terminals, steps S350 and S351 of transmitting, by the base station, a D2D bearer creation response message indicating creation of a D2D bearer to the MME, and steps S380 and S381 of transferring, by the MME, the D2D bearer creation response message to the gateway.

In step S310, the gateway may be divided into a packet data network gateway (P-GW) and a serving gateway (S-GW).

In a session switching method according to an example embodiment of the present invention, the P-GW may determine session switching from cellular communication to device-to-device communication. In other words, the gateway may determine whether a session is to be switched from cellular communication to device-to-device communication based on the proximity measurement result in the proximity measurement procedure described above with reference to FIG. 2. The P-GW determines whether the session is to be switched.

Further, the P-GW determines QoS of the D2D bearer based on a QoS policy. In other words, the P-GW determines QoS parameters such as a QoS class identifier (QCI), an allocation and retention priority (ARP), a guaranteed bit rate (GBR), and a maximum bit rate (MBR) in a bearer level.

Further, the P-GW allocates a pair identifier (pair ID) of a terminal pair performing device-to-device communication. When the pair identifier has been already allocated in the proximity measurement procedure described above with reference to 2, such an existing pair identifier is used.

Meanwhile, the P-GW may determine whether the switching from cellular communication to device-to-device communication to be performed is switching needing service continuity.

In step S310, the P-GW may transfer a D2D bearer creation request (Create D2D Bearer Request) message to the S-GW. The D2D bearer creation request message may be a message including a pair identifier, an International Mobile Subscriber Identity (IMSI), D2D bearer QoS, a D2D traffic flow template (TFT), and a switchback EPS bearer ID (SBI). The switchback EPS bearer ID (SBI) is a bearer for switchback used for switchback from the device-to-device communication to the cellular communication. An SBI value is an EPS bearer ID corresponding to switching. The SBI is defined as 0 when switchback is not necessary. The S-GW transfers the D2D bearer creation request message received from the P-GW, to the MME.

In step S320, the MME receiving the D2D bearer creation request message from the gateway selects an D2D bearer ID. In this case, the D2D bearer ID may be local information specific to the UE.

Further, the MME may organize a proximity service management request message (ProSe management (PSM) request message) in a non-access stratum (NAS) level. The proximity service management request message may include a pair identifier, an IMSI, a D2D bearer ID, D2D bearer QoS, a D2D bearer TFT, and an SBI.

In step S320, the MME may transmit a D2D bearer setup request message to the base station (eNB). The D2D bearer setup request message may include the pair identifier, the D2D bearer ID, and the D2D bearer QoS and may further include the proximity service management request message described above.

In step S330, the base station (eNB) maps the D2D bearer QoS to D2D radio bearer QoS and transmits an RRC connection reconfiguration message to the terminal. In this case, the RRC connection reconfiguration message may include a D2D radio bearer ID and D2D radio bearer QoS and may further include the proximity service management request message received through the D2D bearer setup request message from the MME above.

The terminal stores the D2D radio bearer ID, the SBI, and TFT based on the proximity service management request message included in the RRC connection reconfiguration message from the base station. Further, the NAS level of the terminal may organize a proximity service management response message including the pair identifier and the D2D bearer ID, and may transmit the proximity service management response message as a direct transfer message to the eNB (S360).

In step S340, the base station receives the RRC connection reconfiguration completion message from the terminal. In this case, the RRC connection reconfiguration completion message that the base station receives from the terminal is used for the terminal to notify the base station that the creation of the D2D radio bearer has been completed.

In step S350, the base station transmits the D2D bearer setup response message indicating that the D2D radio bearer has been created to the MME. The D2D bearer setup response message may include the pair identifier and the D2D bearer ID. Further, the base station may transmit, to the MME, the proximity service management response message received from the terminal in step S360 as an uplink NAS transport message (S370).

In this case, the MME receiving the D2D bearer setup response message and the proximity service management response message means that the terminals are ready to perform the device-to-device communication.

Finally, in step S380, the MME transfers a D2D bearer creation response message (Create D2D Bearer Response) to the gateway. In this case, the D2D bearer creation response message may include the pair identifier and the D2D bearer ID.

More specifically, step S380 may include a step of transferring, by the MME, the D2D bearer creation response message to the S-GW, and a step of transferring, by the S-GW, the D2D bearer creation response message to the P-GW.

Meanwhile, steps S310, S320, S330, S340, S350, S360, S370 and S380 described above are a procedure performed for the first terminal 310, and the same steps S311, S321, S331, S341, S351, S361, S371, S381 corresponding to steps S310, S320, S330, S340, S350, S360, S370 and S380 described above may be performed for the second terminal 320 that will perform device-to-device communication with the first terminal.

In this case, the steps for the second terminal may not necessarily be performed after the steps for the first terminal are performed, unlike the illustration in FIG. 3. The steps for the first terminal and the steps for the second terminal may be performed in parallel since the steps for the first terminal and the steps for the second terminal are performed in an independent terminal context (UE context). Further, it is to be noted that the steps for the respective terminals may not necessarily be performed in order illustrated in FIG. 3 as long as order of the requests and the corresponding response messages is maintained.

When the preparation procedure described with reference to FIG. 3 is completed, creation and setting of the D2D bearer and the D2D radio bearer are both completed, such that terminals which are D2D bearer creation targets can perform device-to-device communication anytime.

Figure 4:
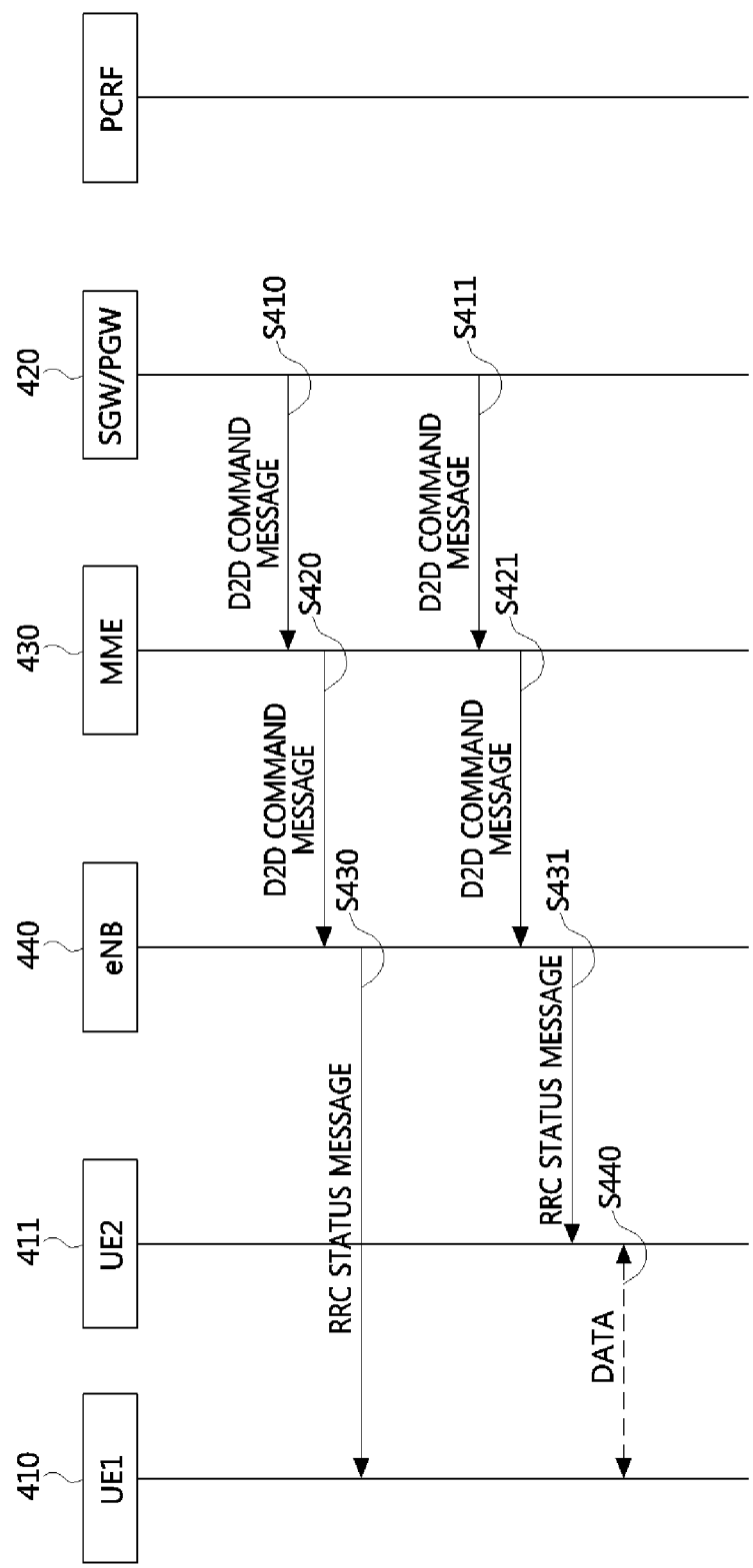
FIG. 4 is a message flow diagram illustrating another aspect of session switching from cellular communication to device-to-device communication according to an example embodiment of the present invention.

FIG. 4 is a message flow diagram illustrating another aspect of session switching from cellular communication to device-to-device communication according to an example embodiment of the present invention.

In other words, another aspect of the session switching procedure according to an example embodiment of the present invention described with reference FIG. 4 is a procedure for actually performing device-to-device communication. Another aspect of the session switching procedure according to an example embodiment of the present invention is a procedure for performing device-to-device communication, and may include steps S410 and S411 of transferring, by the gateway, a D2D command message for performing device-to-device communication to the MME, steps S420 and S421 of transferring, by the MME, the D2D command message to the base station, and steps S430 and S431 of transferring, by the base station, an RRC status message including the D2D command message to the terminals.

In step S410, the gateway 420 transfers the D2D command message for performing device-to-device communication to the MME when determining that a terminal pair (the first and second terminals) is a D2D scheduling target.

More specifically, in step S410, when the P-GW constituting the gateway receives the D2D bearer creation response message from the first terminal and the D2D bearer creation response message from the second terminal and determines that the pair of first and second terminals can be D2D scheduling targets in the aspect of the session switching procedure of an example embodiment of the present invention described above, the P-GW may transmit the D2D command to the S-GW and the S-GW may transfer the D2D command received from the P-GW, to the MME.

In this case, the D2D command should be transferred to the respective terminals constituting the terminal pair that will perform device-to-device communication. For example, in step S410, the D2D command for the first terminal is transferred to the MME, and in step S411, the D2D command for the second terminal that will perform device-to-device communication with the first terminal is transferred to the MME.

In steps S420 and S421, the MME transfers the D2D command to the base station (eNB). In this case, the D2D command should be transferred to the respective terminals constituting the terminal pair that will perform device-to-device communication. The base station receiving the D2D command for the first terminal and the D2D command for the second terminal initiates L2 scheduling for the terminals.

In steps S430 and S431, the base station receiving the D2D commands transmits an RRC status message including content of the D2D command message to the first terminal and the second terminal.

Then, the first terminal and the second terminal perform device-to-device communication (S440). The terminals switch a traffic flow of an application to the D2D radio bearer using a D2D packet filter included in the stored D2D TFT received through the proximity service management request message in the aspect of the session switching procedure of the example embodiment of the present invention as described above.

Meanwhile, steps S410, S420 and S430 described above are a procedure performed for the first terminal 410, and the same steps S411, S421 and S431 corresponding to steps S410, S420 and S430 described above may be performed for the second terminal 411 that will perform device-to-device communication with the first terminal.

In this case, the steps for the second terminal may not necessarily be performed after the steps for the first terminal are performed, unlike the illustration in FIG. 4. The steps for the first terminal and the steps for the second terminal may be performed in parallel since the steps for the first terminal and the steps for the second terminal are performed in an independent terminal context (UE context). Further, it is to be noted that the steps for the respective terminals may not necessarily be performed in order illustrated in FIG. 4 as long as order of the requests and the corresponding response messages is maintained.

Figure 5:
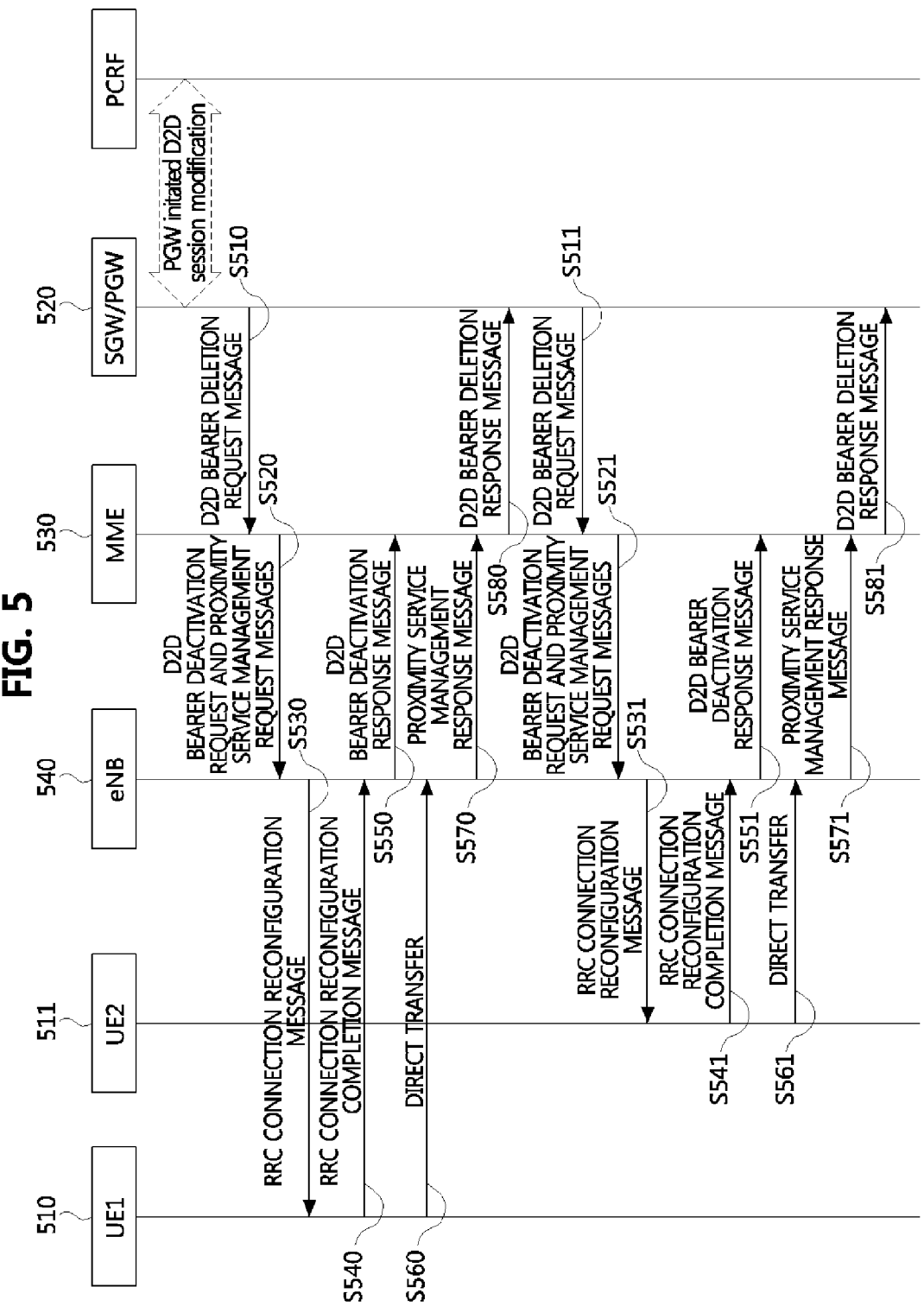
FIG. 5 is a message flow diagram illustrating a procedure for session switching from device-to-device communication to cellular communication according to an example embodiment of the present invention.

Procedure for Session Switching from Device-to-Device Communication to Cellular Communication FIG. 5 is a message flow diagram illustrating a procedure of session switching from device-to-device communication to cellular communication according to an example embodiment of the present invention.

The procedure illustrated in FIG. 5 illustrates a procedure in which two terminals communicating through a device-to-device communication session are switched to a cellular communication session.

Referring to FIG. 5, the session switching procedure according to an example embodiment of the present invention may include a procedure for message exchange between network components (a gateway, an MME, and a base station) and terminals (a first terminal and a second terminal), and session switching. In other words, the procedure for session switching from device-to-device communication to cellular communication according to an example embodiment of the present invention may include steps S510 and S511 of transferring, by the gateway, a D2D bearer deletion request message including a D2D bearer ID to the MME, steps S520 and S521 of transferring, by the MME, a D2D bearer deactivation request message including the D2D bearer ID to the base station, steps S530 and S531 of transmitting, by the base station, an RRC connection reconfiguration message to terminals, the RRC connection reconfiguration message including a D2D radio bearer ID corresponding to the D2D bearer ID and requesting to release a D2D radio bearer indicated by the D2D radio bearer ID, steps S540 and S541 of receiving, by the base station, an RRC connection reconfiguration completion message indicating release of the D2D radio bearer from the terminals, steps S550 and S551 of transmitting, by the base station, a D2D bearer deactivation response message indicating release of the D2D bearer to the MME, and steps S580 and S581 of transferring, by the MME, the D2D bearer deactivation response message to the gateway.

In steps S510 and S511, the gateway may be divided into a packet data network gateway (P-GW) and a serving gateway (S-GW). The P-GW may determine switching from device-to-device communication to cellular communication, similar to the switching to device-to-device communication described above. In other words, the gateway may determine whether the session is to be switched from a device-to-device communication session to a cellular communication session based on the proximity measurement result in the proximity measurement procedure described above with reference to FIG. 2. The P-GW determines whether the session is to be switched. For example, the switching to cellular communication may be determined when a distance between the terminals becomes long or a radio channel state between the terminals becomes poor based on the proximity measurement result, unlike the switching to the device-to-device communication described above.

In steps S510 and S511, the P-GW may transmit a D2D bearer deletion request (Delete D2D Bearer Request) message to the S-GW, and the D2D bearer deletion request message may include a pair identifier and a D2D bearer ID. The S-GW transfers the D2D bearer deletion request message received from the P-GW, to the MME.

in steps S520 and S521, the MME receiving the D2D bearer deletion request message from the gateway may transmit a D2D bearer deactivation request message (Deactivate D2D Bearer Request message) to the base station (eNB).

Further, the MME may organize a proximity service management request message (ProSe management (PSM) request message) in a non-access stratum (NAS) level. The proximity service management request message may include a pair identifier and a D2D bearer ID.

Therefore, the D2D bearer deactivation request message may include the pair identifier and the D2D bearer ID and may further include the proximity service management request message described above.

In steps S530 and S531, the base station (eNB) transmits a RRC connection reconfiguration message to the terminal to request release of the D2D bearer. In this case, the RRC connection reconfiguration message may include a D2D radio bearer ID corresponding to the D2D bearer ID included in the D2D bearer deactivation request message described above, and may further include the proximity service management request message received through the D2D bearer deactivation request message from the MME.

The terminal switches a traffic flow of an application to an EPS radio bearer using a link of the radio bearer ID and the SBI. Also, the terminal releases the D2D bearer and the D2D radio bearer. Further, a terminal NAS organizes a proximity service management response message including the pair identifier and the D2D bearer ID. Also, the terminal transmits the proximity service management response message to the base station using a direct transfer message (S560 and S561).

In steps S540 and S541, the base station receives an RRC connection reconfiguration completion message indicating that the release of the D2D bearer has been completed from the terminals.

In steps S550 and S551, the base station transmits a D2D bearer deactivation response message indicating that the D2D radio bearer has been released to the MME. In this case, the D2D bearer deactivation response message may include the pair identifier and the D2D bearer ID. Further, the base station may transmit a proximity service management response message to the MME through uplink NAS transport (S570 and S571).

In this case, the MME receiving the D2D bearer deactivation response message and the proximity service management response message means that the release of the device-to-device communication has been completed.

Finally, in steps S580 and S581, the MME transfers a D2D bearer deletion response message (Delete D2D Bearer Response) to the gateway. In this case, the D2D bearer deletion response message may include the pair identifier and the D2D bearer ID.

More specifically, steps S580 and S581 may include a step in which the MME transfers the D2D bearer deletion response message to the S-GW, and a step in which the S-GW transfers the D2D bearer deletion response message to the P-GW.

Meanwhile, steps S510, S520, S530, S540, S550, S560, S570 and S580 described above is a procedure performed for the first terminal 510, and the same steps S511, S521, S531, S541, S551, S561, S571 and S581 corresponding to the steps described above may also be performed for the second terminal 520 that will perform device-to-device communication with the first terminal.

In this case, the steps for the second terminal may not necessarily be performed after the steps for the first terminal are performed, unlike the illustration in FIG. 5. The steps for the first terminal and the steps for the second terminal may be performed in parallel since the steps for the first terminal and the steps for the second terminal are performed in an independent terminal context (UE context). Further, it is to be noted that the steps for the respective terminals may not necessarily be performed in order illustrated in FIG. 5 as long as order of the requests and the corresponding response messages is maintained.

While the example embodiments of the present invention and their advantages have been described in detail, it should be understood that various changes, substitutions and alterations may be made herein without departing from the scope of the invention.

What is claimed is:

1. A method of switching communication from cellular communication to device-to-device (D2D) communication comprising:
   (a) transferring, by a gateway, a D2D bearer creation request message to a mobility management entity (MME);
   (b) creating, by the MME, a D2D bearer identifier (ID) and transferring a D2D bearer setup request message based on the D2D bearer creation request message and including the D2D bearer ID to a base station;
   (c) mapping, by the base station, D2D bearer quality of service (QoS) to D2D radio bearer QoS, and transmitting a radio resource control (RRC) connection reconfiguration message to terminals;
   (d) receiving, by the base station, an RRC connection reconfiguration completion message indicating creation of a D2D radio bearer from the terminals;
   (e) transmitting, by the base station, a D2D bearer creation response message indicating creation of a D2D bearer to the MME; and
   (f) transferring, by the MME, the D2D bearer creation response message to the gateway,
   wherein in step (b), the MME generates a proximity service management request message in a non-access stratum (NAS) level, includes the proximity service management request message in the D2D bearer creation request message, and transmits the resultant message to the base station,
   wherein the proximity service management request message includes a pair identifier, an International Mobile Subscriber Identity (IMSI), the D2D bearer ID, the D2D bearer QoS, D2D bearer traffic flow template (TFT), and the cellular switchback evolved packet system (EPS) bearer ID (SBI), and
   wherein the SBI is a bearer used for switchback from the D2D communication to the cellular communication.

2. The method according to claim 1, wherein:
   in step (a), the gateway includes a packet data network gateway (P-GW) and a serving gateway (S-GW), and
   step (a) includes
   determining, by the P-GW, QoS of a D2D bearer, creating a pair identifier of a device-to-device communication pair, and transferring, to the S-GW, the D2D bearer creation request message including at least one of the pair identifier, the D2D bearer QoS, and a cellular switchback EPS bearer ID (SBI); and
   transferring, by the S-GW, the D2D bearer creation request message to the MME.

3. The method according to claim 1, wherein: in step (c), the base station includes the proximity service management request message in the RRC connection reconfiguration message and transmits the resultant message to the terminal.

4. The method according to claim 1, wherein: in step (d), the base station receives a direct transfer message including the proximity service management response message from an NAS of the terminal.

5. The method according to claim 4, wherein: in step (e), the base station transmits an uplink NAS transport message including the proximity service management response message to the MME.

6. The method according to claim 1, wherein:
   in step (f), the gateway includes a packet data network gateway (P-GW) and a serving gateway (S-GW), and
   step (f) includes:
   transferring, by the MME, the D2D bearer creation response message to the S-GW; and
   transferring, by the S-GW, the D2D bearer creation response message to the P-GW.

* * * * *